United States Patent [19]
Ono

[11] Patent Number: 5,512,812
[45] Date of Patent: Apr. 30, 1996

[54] VEHICLE GENERATOR CONTROL DEVICE

[75] Inventor: Takahiko Ono, Hyogo, Japan

[73] Assignee: Mitsubishi Denki Kabushiki Kaisha, Tokyo, Japan

[21] Appl. No.: 115,766

[22] Filed: Sep. 3, 1993

[30] Foreign Application Priority Data

Sep. 7, 1992 [JP] Japan .................. 4-238302

[51] Int. Cl.⁶ .................................................. H02P 9/00
[52] U.S. Cl. .................................. 322/28; 322/21
[58] Field of Search ........................ 322/27, 28, 29

[56] References Cited

U.S. PATENT DOCUMENTS

| | | | |
|---|---|---|---|
| 4,379,990 | 4/1983 | Sievers et al. | 322/99 |
| 4,459,489 | 7/1984 | Kirk et al. | 290/13 |
| 4,680,529 | 7/1987 | Komurasaki et al. | 322/28 |
| 4,682,044 | 7/1987 | Hotate et al. | 290/40 B |
| 4,839,576 | 6/1989 | Kaneyuki et al. | 322/25 |
| 5,254,935 | 10/1993 | Vercesi et al. | 322/29 |
| 5,352,971 | 10/1994 | Nishimura | 322/27 |

FOREIGN PATENT DOCUMENTS

| | | |
|---|---|---|
| 58-46842 | 3/1983 | Japan . |
| 59-83600 | 5/1984 | Japan . |
| 1308135 | 12/1989 | Japan . |

*Primary Examiner*—Steven L. Stephan
*Assistant Examiner*—Nicholas Ponomarenko
*Attorney, Agent, or Firm*—Sughrue, Mion, Zinn, Macpeak, & Seas; Richard C. Turner

[57] ABSTRACT

A vehicle generator control device comprises a detector adapted to detect whether or not a lamp load has been applied; and a control circuit. When an electric load is applied (i.e., when the terminal voltage of a battery is lowered) under the condition that the application of the lamp load has been detected, the control circuit suspends a load response control operation (increasing the field current of the generator by turning the field current switch on and off), and instead increases the field current abruptly by maintaining the field current switch conductive, thereby to increase the terminal voltage of the battery immediately. Thereby, a vehicle generator control device is provided which is free from a difficulty that, when a load response control operation is carried out with lamps with head turned on, the output light of these lamps are decreased or the lamps flicker.

3 Claims, 3 Drawing Sheets

VEHICLE GENERATOR CONTROL DEVICE

BACKGROUND OF THE INVENTION

This invention relates to a vehicle generator control device with load response control device which detects a reduction in the voltage of a battery to gradually increase the field current of the field coil of the generator thereby gradually increasing the battery voltage.

A generator control device of his type has been disclosed by Unexamined Japanese Patent Application (Kokai) Sho-59-83600/(1984). The generator control device performs a so-called "load response control operation" as follows: That is, when it detects a reduction in the terminal voltage of the battery which is caused when a large electric load is applied to the generator, it gradually increases the field current of the generator from the value which it had before the application of the electric load, thereby to gradually increase the terminal voltage of the battery.

This load response control operation allows the load of the generator to be slowly applied to the engine, thus eliminating a difficulty that the engine is vibrated or stopped by abrupt application of a load to it.

However, the above-described conventional vehicle generator control device is disadvantageous in the following points: When, under the condition that lamps are turned on for instance at night, a large electric load other than the lamp load is applied to the battery, the battery voltage is decreased: However, the battery voltage thus decreased is gradually increased by the above-described load response control operation. Hence, the output light beams of the lamps are held low in the quantity of light for a certain period of time. When, under the same condition, electrical loads other than the lamp load are intermittently operated, the load response control operation causes the lamps to flicker.

In other words, the conventional vehicle generator control device suffers from the following difficulty: When, in the case where the operator is sensitive to light while driving the vehicle during night time, a great electric load is applied to the battery or electric loads are intermittently operated, the load response control operation is carried out, with the results that the lamps are lowered in the intensity of light or flicker, obstructing the sight of the operator, and making the persons in the vehicle uneasy or uncomfortable.

SUMMARY OF THE INVENTION

Accordingly, an object of this invention is to eliminate the above-described difficulty accompanying a conventional vehicle generator control device. More specifically, an object of the invention is to provide a vehicle generator control device which is free from difficulties that, because the load response control operation is carried out with the lamps turned on, the latter are lowered in the quantity of light or caused to flicker, thus making the persons on the vehicle uneasy or uncomfortable.

The foregoing object of the invention has been achieved by the provision of a vehicle generator control device which, when a reduction of the battery voltage is detected under the condition that the application of the lamp load has been detected, suspends the gradual increasing of the field current of the generator, and instead increases it abruptly.

Hence, with the vehicle generator control device of the invention, when, with the lamps held turned on, electric loads other than the lamp load are applied, the load response control operation is suspended, so that the field current is increased abruptly to increase the battery voltage.

DETAILED DESCRIPTION OF PREFERRED EMBODIMENTS

One preferred embodiment of this invention will be described with reference to the accompanying drawings.

Figure 1:
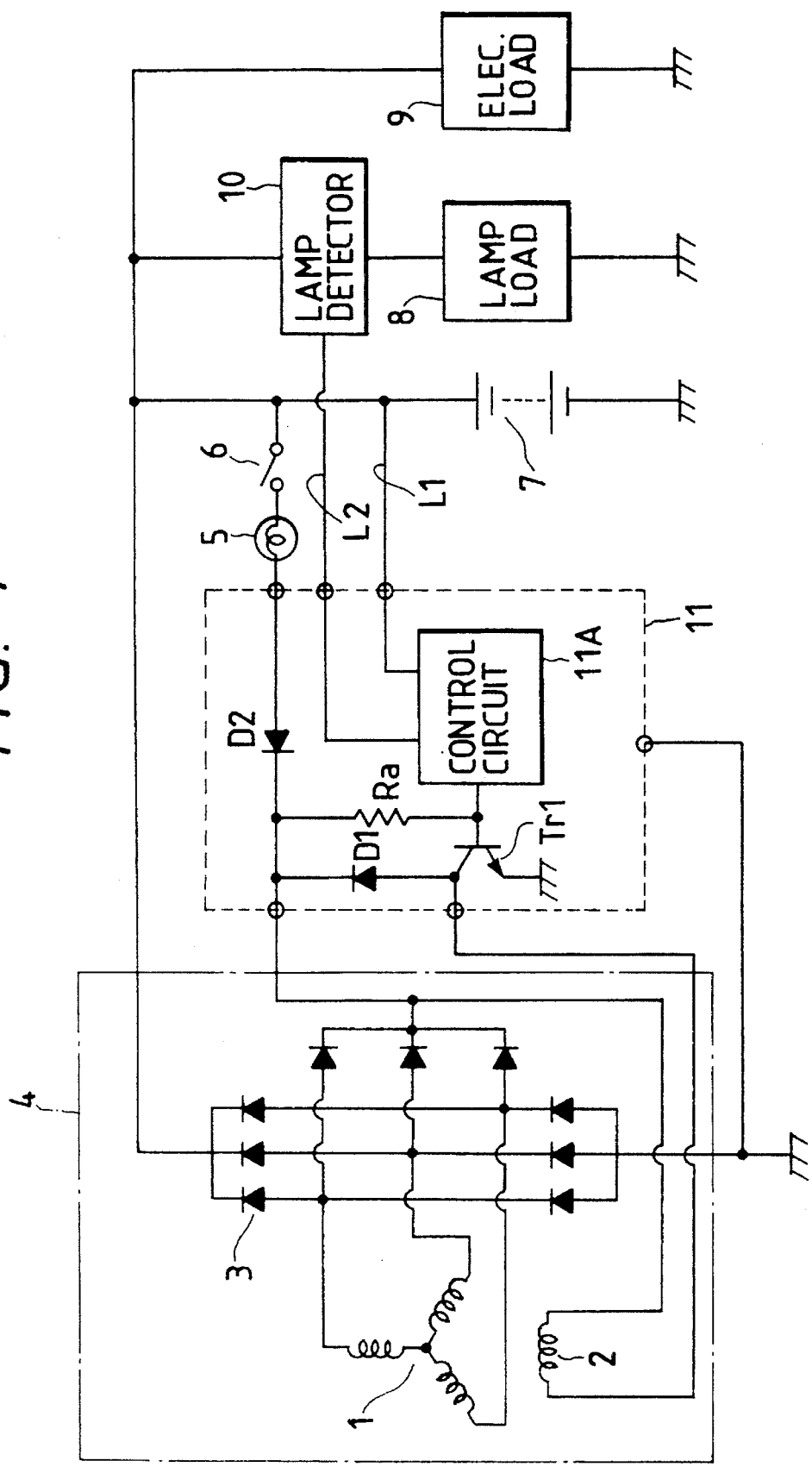
FIG. 1 is a circuit diagram, partly as a block diagram, showing the arrangement of a vehicle generator control device, which constitutes one embodiment of this invention.

FIG. 1 is a circuit diagram showing a vehicle generator control device, which constitutes the one embodiment of the invention. In FIG. 1, reference numeral 1 designates a stator coil assembly; 2, a field coil; and 3, a rectifier for rectifying three-phase alternating currents outputted by the stator coil assembly. The stator coil assembly 1, the field coil 2, and the rectifier 3 form a generator 4.

Further in FIG. 1, reference numeral 5 denotes a charge lamp; 6, a key switch; 7, a battery; 8, a lamp load; 9, an electric load other than the lamp load 8; and 10, a detector for detecting whether or not the lamp load 8 is applied. In FIG. 1, switches for applying the lamp load 8 and the electric load 9 are not shown.

Further in FIG. 1, reference numeral 11 designates a control section, which monitors the terminal voltage of the battery 7 (i.e., the battery voltage) through a line L1, and monitors a detection signal through a line L2 which is provided by the detector 10, thereby to adjust the voltage of the generator, and to control a load response control operation.

The control section 11 comprises a control circuit 11A, an output transistor Tr1, diodes D1 and D2, and a resistor Ra. The output transistor Tr1, being connected in series to the field coil 2, serves as a field current switch.

Figure 4:
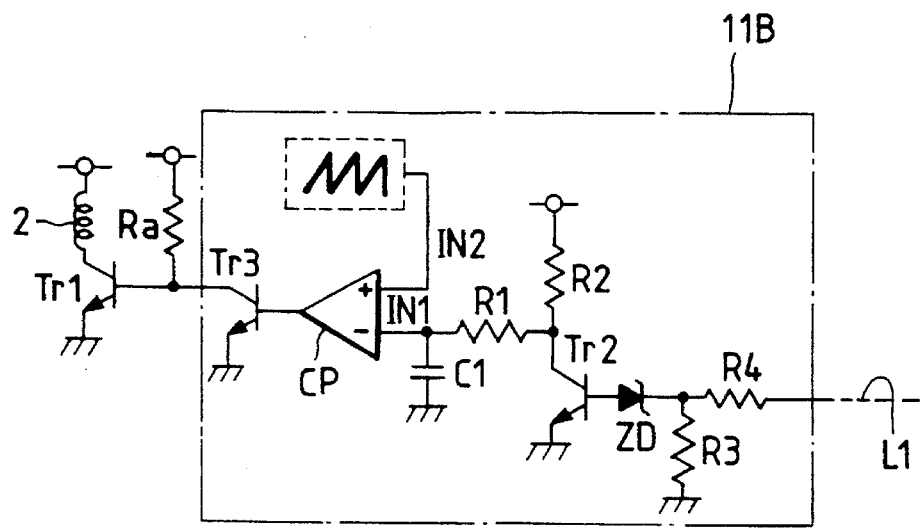
FIG. 4 is a circuit diagram showing the arrangement of a conventional control circuit corresponding to the control circuit in the vehicle generator control device of FIG. 1.

FIG. 4 shows an example of a conventional type control circuit 11B, which is designed as follows: It detects the terminal voltage of the battery 7, and gradually changes its operating signal in level with the aid of a RC circuit made up of a capacitor C1 and resistors R1 and R2. The operating signal thus processed and a triangular wave are applied to a comparator CP, to cause the latter CP to provide a pulse-width-modulated (PWM) signal. The pulse-width-modulated signal thus provided is utilized to gradually increase the field current.

Figure 5:
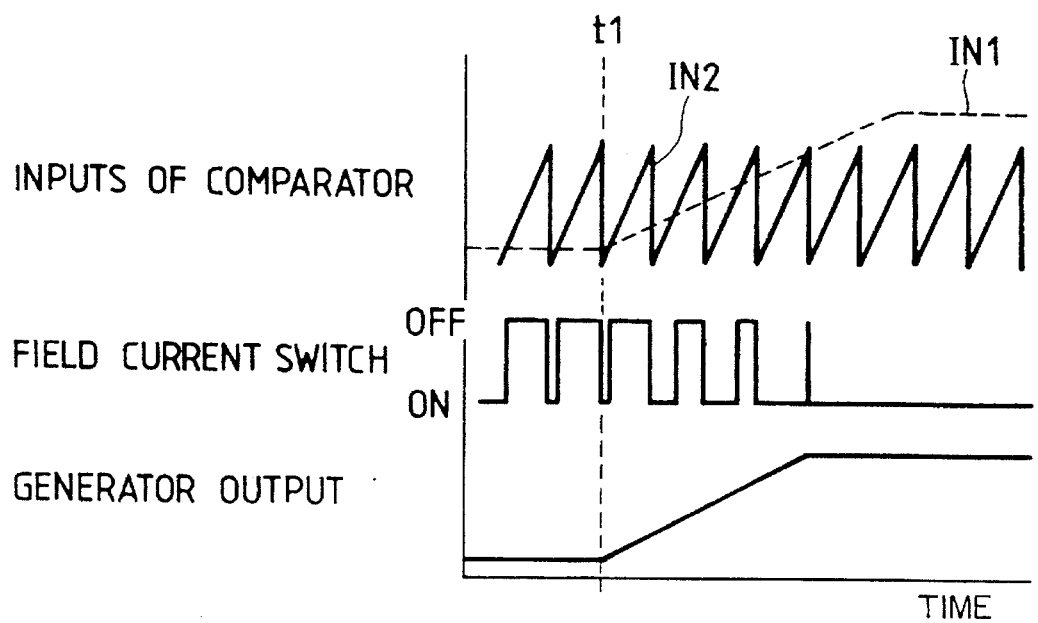
FIG. 5 is a time chart for a description of the operation of the conventional control circuit shown in FIG. 4.

That is, the conventional control circuit 11B operates as follows: When the lamp load 8 or the electric load 9 is applied (at the time instant t1 in FIG. 5), the terminal voltage of the battery 7 is decreased. As a result, in the conventional control circuit 11B, the transistor Tr2 is rendered non-conductive (off), and accordingly the potential at the connecting point of the collector of the transistor Tr2 and the resistor R2 is changed from "L (low)" level to "H (high)"

level. Therefore, an inversion input IN1 to the comparator CP is gradually increased according to the time constant of the RC circuit made up of the capacitor C1 and the resistors R1 and R2 (cf. input of the comparator shown in FIG. 5).

The comparator CP compares the inversion input IN1, which is gradually increased, with a non-inversion input IN2 which is a triangular wave, to output a pulse-width-modulated (PWM) signal. In response to the pulse-width-modulated signal, the transistor Tr3 is turned on and off, so that the field current switch Tr1 is turned on and off (cf. field current switch shown in FIG. 5). As a result, the field current is gradually increased, so that the output of the generator 4 is gradually increased (cf. generator output shown in FIG. 5), and the terminal voltage of the battery 7 is gradually increased.

On the other hand, the embodiment of the invention operates as follows: When the electric load 9 is applied under the condition that the application of the lamp load 8 has been detected by the detector 10, the non-inversion input o IN2 to the comparator CP is set to "L" level, so that the load response control operation is inhibited. Therefore, the field current is abruptly increased; that is, the terminal voltage of the battery 7 is increased immediately.

Figure 2:
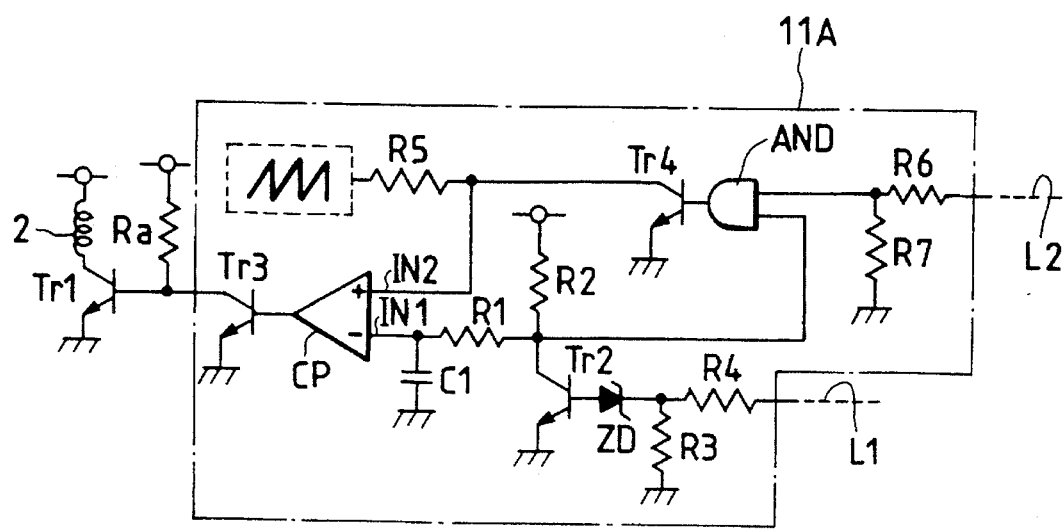
FIG. 2 is a circuit diagram showing the arrangement of a control circuit in the vehicle generator control device shown in FIG. 1.
Figure 3:
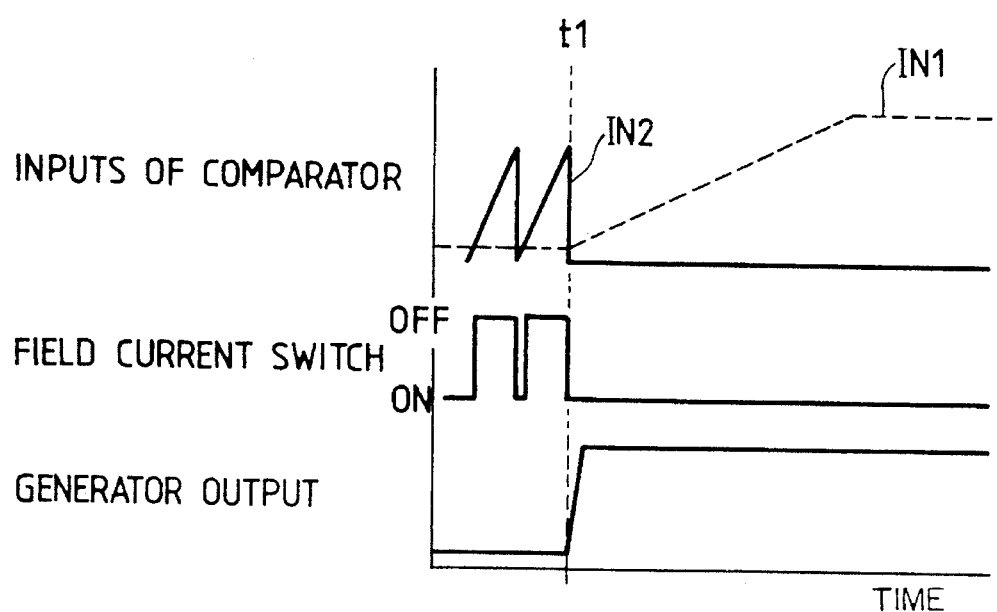
FIG. 3 is a time chart for a description of the operation of the control circuit shown in FIG. 2.

FIG. 2 shows a concrete example of the control circuit 11A according to the embodiment of the invention. The control circuit 11A operates as follows: When the lamp load 8 is applied, the detector 10 applies an "H" level detection signal to one of the input terminals of an AND circuit. When, under this condition, the electric load 9 is applied (at the time instant t1 in FIG. 3), the terminal voltage of the battery 7 is decreased, so that a transistor Tr2 is rendered non-conductive (off). Therefore, an inversion input IN1 to a comparator CP is gradually increased according to the time constant of a CR circuit consisting of a capacitor C1 and resistors R1 and R2 (cf. input of comparator shown in FIG. 3).

On the other hand, when the transistor Tr2 is rendered non-conductive (off) in the above-described manner, an "H" level signal is applied to the other input terminal of the AND circuit. As a result, a transistor Tr4 is rendered conductive (on), and a non-inversion input IN2 to the comparator CP is forcibly set to "L" level. Accordingly, upon application of the electric load 9, the output of the comparator CP is set to "L" level, and maintained in this state. Therefore, a transistor Tr3 is maintained nonconductive (off), and the field current switch Tr1 is maintained conductive (on) (cf. field current switch shown in FIG. 3). Hence, the gradual increasing of the field current is stopped, and instead the field current is abruptly increased, so that the output of the generator is abruptly increased (cf. generator outputs shown in FIG. 3), and the terminal voltage of the battery 7 is therefore immediately increased.

In the case when, on the other hand, the lamp load 8 is not applied, the detection signal applied from the detector 10 to the one input terminal of the AND circuit is set to "L" level. Therefore, the transistor Tr4 is maintained nonconductive irrespective of the input applied to the other input terminal of the AND circuit, so that a triangular wave is applied, as the non-inversion input IN2, to the comparator CP. Hence, in this case, with the electric load 9 applied, the generator 4 is controlled in response to the load.

In the case where, in the above-described embodiment, the lamp load 8 has been applied, an idle speed controller (not shown) may be operated so that the control circuit be ready for application of the electric load.

In the above-described embodiment, the triangular wave and the gradually changing value are subjected to comparison to form the pulse-width-modulated signal. This technical concept may be equally applied to the case where the load response control operation is carried out with a microcomputer.

As was described above, the generator control device of the invention is so designed that, when a reduction of the battery voltage is detected under the condition that the application of the lamp load has been detected, the device operates to suspend the gradual increasing of the field current of the generator, and instead increases the field current abruptly. Hence, the device has eliminated the difficulties that, because the load response control operation is carried out with the lamps kept turned on, the latter are lowered in the quantity of light or caused to flicker, thus making the persons on the vehicle uneasy or unpleasant.

What is claimed is:

1. A vehicle generator control device having load response control means which detects a reduction in voltage of a battery and gradually increases field current of the respective field coil of a generator thereby to gradually increase the voltage of said battery, said generator control device comprising:

detecting means for detecting whether or not a lamp load has been applied; and field current increasing means for, when a reduction in the voltage of said battery is detected under the condition that the application of said lamp load has been detected by said detecting means, suspending the gradual increasing of said field current, and instead increasing said field current abruptly.

2. A vehicle generator control device having load response control circuit which detects an application of load to gradually increase a field current of a field coil of a generator to thereby gradually increase a voltage of a battery, said generator control device comprising:

means for turning on/off conduction of field current of the field coil, said turning on/off means including switching means;

detecting means for detecting whether a lamp load is applied;

control means for forcing said turning on/off means turn on said conduction of field current when both said lamp load and a respective load other than said lamp load are applied.

3. A vehicle generator control device comprising:

load response control means for receiving a first signal indicative of a battery voltage and for issuing a second signal indicative of load being applied to said battery if the first signal exceeds a predetermined voltage, said load response control means gradually increasing a field current of a field coil of a generator in response to said second signal;

detecting means for issuing a third signal when a lamp load has been applied; and field current increasing means for, when both said second and third signals are issued, suspending the gradual increasing of said field current, and for instead increasing said field current abruptly.

* * * * *